July 2, 1940.    R. D. SHAW    2,206,707
SEALING DEVICE
Filed May 11, 1938
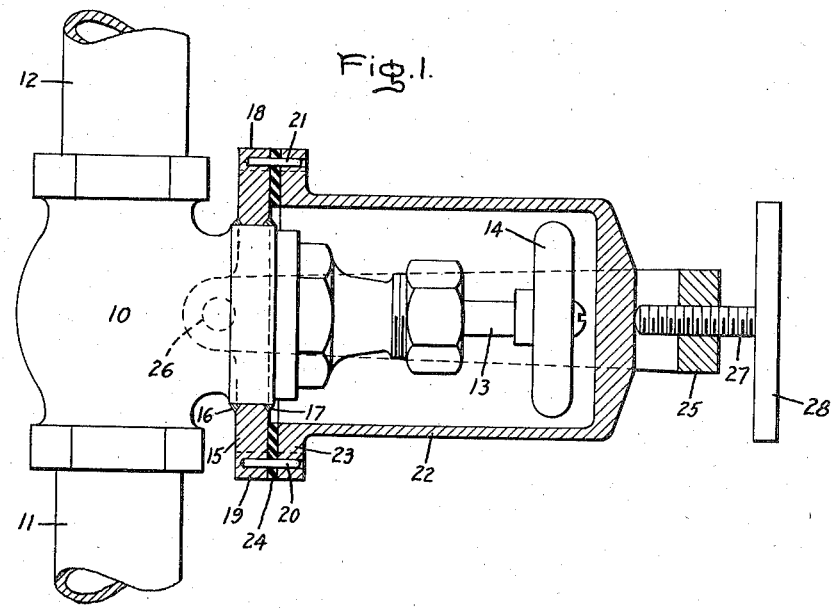
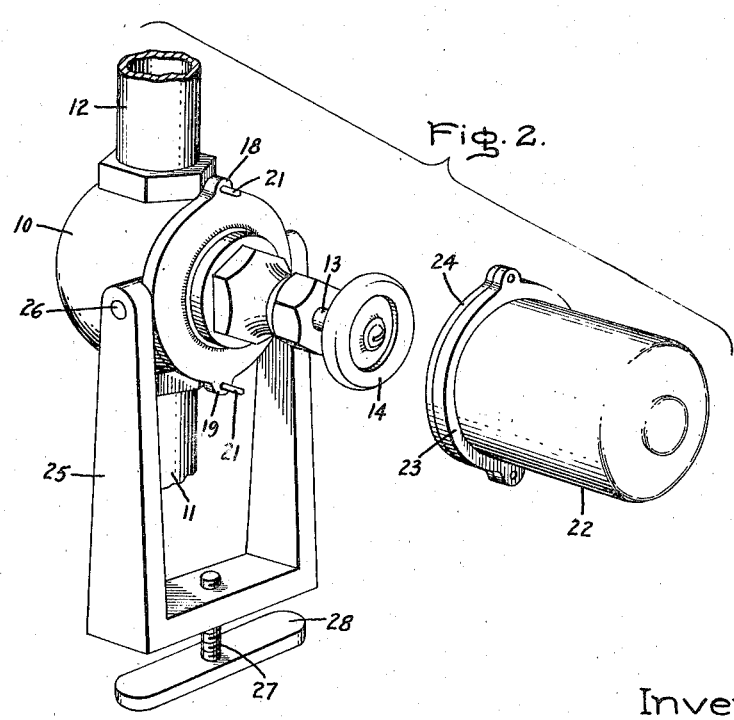
Inventor:
Roscoe D. Shaw,
by Harry E. Dunham
His Attorney.

Patented July 2, 1940

2,206,707

UNITED STATES PATENT OFFICE 2,206,707

SEALING DEVICE

Roscoe D. Shaw, Pittsfield, Mass., assignor to General Electric Company, a corporation of New York Application May 11, 1938, Serial No. 207,293

1 Claim. (Cl. 137—111)

The present invention relates to a sealing device including a valve for controlling the flow of fluid through a conduit and means to prevent leakage of air along the movable elements of such valve into the conduit and vice-versa, to prevent the leakage of fluid from the conduit into the atmosphere. Such sealing devices are provided, for instance, in connection with mercury power plants to prevent leakage of air into low pressure parts of the mercury system.

The object of my invention is to provide an improved construction of sealing devices whereby a valve may be hermetically sealed and the leakage of air into the fluid path to be controlled substantially prevented.

For a consideration of what I believe to be novel and my invention, attention is directed to the following description and the claim appended thereto in connection with the accompanying drawing.

In the drawing, Fig. 1 illustrates a sealing device partly in section embodying my invention; and Fig. 2 shows a perspective view of the arrangement of Fig. 1 with certain elements taken apart.

The arrangement comprises a valve with a flanged body or casing 10 connecting conduit sections 11 and 12 and movable valve means including a stem 13 with a handwheel 14 secured to the end of the stem for controlling the flow of fluid from the section 11 through the valve casing 10 to the section 12. The casing 10 and the valve stem 13 broadly constitute a casing structure having extending therefrom an element along which leakage of fluid from the interior of the casing may occur. Further details of the movable valve means are not shown because they do not form a part of my invention. The sealing arrangement to prevent leakage of air along the valve stem 13 into the casing 10 comprises a ring 15 secured to the casing 10 by welds 16 and 17 to form a flange. The ring 15 has ears 18, 19 with centering pins 20, 21 secured thereto. A sealing cup 22 with a flange 23 is centered on the pins 20, 21 and completely encloses the movable valve means including the stem 13 and the handwheel 14. A packing ring 24 centered at the pins 20, 21, is interposed between the flanges 15 and 23. The sealing cup is tightened into engagement with the ring or flange 15 by means of a U-shaped bracket 25 which has the ends of its legs fulcrumed on pivots 26 secured to the valve casing 10. The pivots 26 as shown in the drawing are secured to diametrically opposite portions of the casing structure and spaced about 90° from the lugs 18, 19 on the ring or annular member 15. A screw 27 with a lever 28 fastened to its outer end is threaded into the cross-bar of the U-shaped bracket 25 and engages with its inner end the bottom of the cup 22 so that the cup may be rigidly forced into engagement with the flange 15 of the casing by turning the screw 27 into the cross-bar of the bracket. The arrangement is shown in Fig. 1 completely assembled. In order to adjust the valve, all that is necessary is to loosen the screw 27 whereby the U-shaped bracket 25 may be turned into the position shown in Fig. 2 and the sealing cup 22 removed, whereupon the handwheel 14 may be turned to adjust the valve. After adjustment of the valve the sealing arrangement is reassembled by centering the ring 24 and the cup 22 on the flange 15, turning the bracket into the proper position and tightening the screw 27. In order to keep the dimensions of the sealing arrangement small the ears 18, 19 with the centering pins 20, 21 as pointed out above are arranged at right angles with regard to the pivots 26 for the brackets 25.

What I claim as new and desire to secure by Letters Patent of the United States, is:

In combination with a casing structure having extending therefrom an element along which leakage of fluid from the interior of the casing may occur, a sealing means comprising an annular member fused to the casing, said member having lugs with centering pins on diametrically opposite portions, a sealing ring engaging the member and centered on the pins, a cup for enclosing such element and sealing it to the annular member, the cup having a flange with lugs engaging the sealing ring and centered on the pins, and means for forcing the cup into fluid tight engagement with the sealing ring and the annular member, said means comprising a U-shaped yoke having legs pivotally connected to diametrically opposite portions of said casing structure and spaced 90° from the lugs, and a screw held on the base of the U-shaped yoke and engaging the bottom of the cup.

ROSCOE D. SHAW.